Nov. 28, 1944.    J. L. ANDERSON    2,363,828
METHOD OF WELDING
Filed March 24, 1942
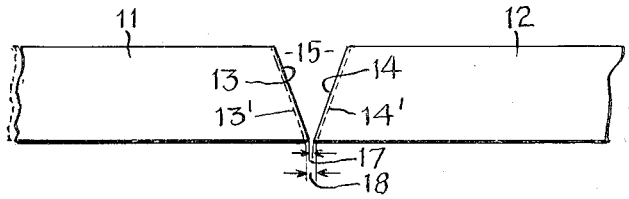
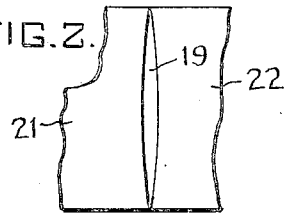
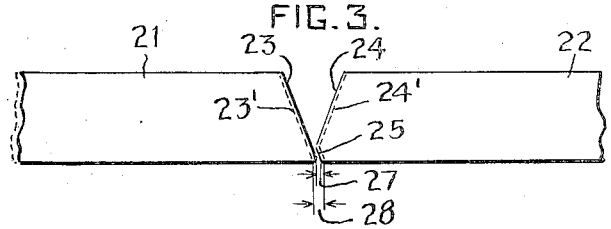
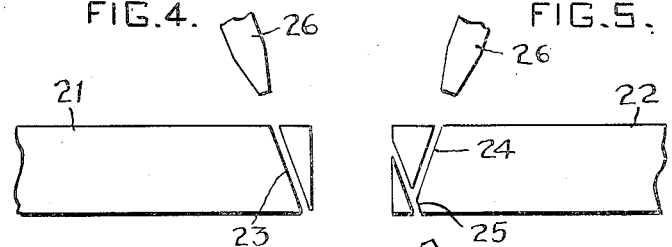
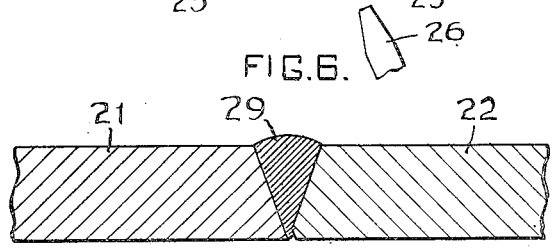
INVENTOR
JAMES L. ANDERSON
BY
ATTORNEY Patented Nov. 28, 1944

2,363,828

UNITED STATES PATENT OFFICE 2,363,828

METHOD OF WELDING

James L. Anderson, Closter, N. J., assignor to Air Reduction Company, Incorporated, New York, N. Y., a corporation of New York Application March 24, 1942, Serial No. 435,929

4 Claims. (Cl. 113—112)

This invention relates to the welding together of metal parts with the addition of filler rod, and the invention is intended especially for connecting the edges of plates.

In its broadest aspects, it is an object of the invention to provide an improved method for connecting metal parts, and the improvement consists in the novel shaping and assembling of the edge faces that are to be joined by the weld metal.

When plates are to be connected by welding with added metal, it is usual to bevel the edges that are to be joined so that when they are brought into confronting relation they have a trough for receiving the filler metal. The edges are generally beveled by means of an oxygen cutting torch and the heat produced by the beveling operation leaves the edge of the plate bowed in a direction that separates the plates along the mid-portion of the seam. This means that even though the edge faces are touching at the bottom of the trough at both ends of the plates, there is a cleft between the plates intermediate their ends, and the cleft becomes progressively wider toward a region midway between the ends of the plates. Similarly, if the plates are positioned for welding with some space between them at their ends to insure full penetration of the weld, the cleft width increases between its ends and it becomes difficult or impossible to prevent the molten metal from running through the bottom of the trough, unless recourse is had to special apparatus such as a chill plate under the trough.

With this invention, the confronting edge faces are shaped and assembled in such a manner that variations in the width of the cleft at the bottom of the trough do not adversely affect the welding operation.

In preparing the plate edges in accordance with this invention, the confronting edge faces are shaped with outside-bevel surfaces on both faces for forming a trough. In addition to these outside-bevel surfaces, one, and only one, of the confronting edges is made with a limited inside-bevel surface along its lower portion and the parts are brought together in a welding assemblage in which the inside-bevel surface overlaps the lower portion of the outside-bevel surface of the other part.

The expression "outside bevel," as used herein, means a bevel surface the plane of which makes an obtuse angle with the top or outside surface of the metal part. An "inside bevel" is a bevel surface the plane of which makes an obtuse angle with the bottom or inside surface of the metal part.

The inside-bevel portion of one plate edge overlapping the lower portion of the bevel face of the other plate does not keep the cleft width uniform, if the plates are bowed, but it does protect the lower portions of the confronting faces from direct heating by the torch or other heating instrumentality used to make the weld, and the likelihood of melting through the bottom of the trough, or widening the trough by melting the lower portions of the edges, is reduced. Another effect is that the overlapping and overlapped portions of the edges are not so highly heated and act to cool molten metal that flows down between them. This makes the lower over-lapped portion of the outside bevel face act as a dam to stop the flow of molten metal through the cleft at the bottom of the trough, even though the cleft is so wide that with a conventional plate assemblage of the prior art the molten metal would run through.

Other objects, features and advantages of the invention will appear or be pointed out as the specification proceeds.

In the accompanying drawing, forming a part hereof:

Fig. 1 is an end view illustrating the effect of a bow in a plate on the width of the cleft at the bottom of a trough that separates the plate from another to which it is to be welded.

Fig. 2 is a reduced-scale, top plan view showing the effect of transverse bow in the plates on the width of the cleft between the confronting edge faces of the plates when brought together in position for welding.

Fig. 3 is an end view showing plates with confronting edge faces shaped and assembled for welding in accordance with this invention.

Figs. 4 and 5 are diagrammatic views illustrating the step of preparing the edges with bevel surfaces such as shown in Fig. 3.

Fig. 6 is a sectional view through a finished weld made in accordance with this invention.

Fig. 7 is a view similar to Fig. 3 but showing a modified form of the invention.

Fig. 1 shows two plates 11 and 12 with confronting faces 13 and 14, respectively, that are to be joined by welding. The faces 13 and 14 are each shaped with an outside bevel of about 20 degrees and form a trough 15 between them having an included angle of 40 degrees. Other and larger angles are often used.

The lower portions of the edes of the plates 11, 12 are usually separated by a small cleft not sufficiently wide to permit molten weld metal to run through. The cleft is indicated in Fig. 1 by the dimension 17. Often a land is provided at the lower end of the bevel faces and in such a case the cleft 17 is important for obtaining full penetration of the weld.

A bow in the plates 11 and 12 causes the confronting edge faces 13 and 14 to be spaced from one another, as indicated by the dotted lines 13' and 14', intermediate the ends of the plates and the width of the cleft at the bottom of the trough at such places is increased to the dimension 18.

The increase of the cleft width from dimension 17 to dimension 18 may cause the molten metal to run through the bottom of the trough, or if somewhat narrower may require that the weld be made more slowly and with greater precision of heating in order to avoid melting the bottom edges and to prevent the puddle of molten metal from breaking through the bottom of the trough.

Fig. 2 is a plan view, on a much smaller scale than Fig. 1, showing two plates 21 and 22 with their edge faces confronting along a cleft 19. The plates 21 and 22 are bowed as the result of an edge beveling operation and the cleft 19 is, therefore, wider intermediate the ends of the plates, the greatest width being approximately midway between the ends of the plates, when the plates are bowed evenly. In Fig. 2 the amount of bow is exaggerated for clearer illustration, and the scale of the view is not large enough to show the bevel of the confronting faces.

Fig. 3 shows an unwelded assemblage of two plates 21 and 22 that have their confronting faces shaped and related in accordance with this invention. The plate 21 has a bevel face 23 similar to the face 13 in Fig. 1. The plate 22, however, has an edge face made up of two bevel surfaces, an outside-bevel surface 24 and an inside-bevel surface 25.

The inside-bevel surface 25 is preferably substantially parallel to the face 23 when the plates 21 and 22 are in alinement, as shown in Fig. 3. The surface 24 is preferably beveled at the same angle as the face 23. This angle is 20 degrees in the drawing, and the included angle of the trough between the bevel faces 23 and 24 is, therefore, 40 degrees.

The plates 21 and 22 are spaced to leave a small cleft between the face 23 and the inside-bevel surface 25 in order to obtain full penetration of the weld for the full thickness of the plates. The height of the inside-bevel surface 25 is substantially less than the height of the outside-bevel surface 24, also to obtain full penetration.

The bow of the plates 21 and 22 causes the faces 23 and 24 to be in the relative positions indicated by the dotted lines 23' and 24' at some point intermediate the ends of the faces to be joined. This bow increases the width of the cleft between the plates from that indicated by dimension 27 to that indicated by dimension 28. The face 25 is always protected from direct heating by the torch or other welding instrumentality, and the lower portion of the edge face 23 is largely protected from direct heating by the overlapping bevel 25.

The lower edge portion of the face 23 extending under the molten puddle in the trough is in position to serve as a dam for holding the molten puddle back, and metal that runs down into the space between the faces 23 and 25 is cooled by contact with the less highly heated face 25 and lower portion of face 23 so that the metal hardens to close the cleft at the bottom of the trough.

Figs. 4 and 5 illustrate the step of beveling the edges of the plates. The face 23 is made by a single cutting jet from a torch 26 that is set at the desired angle to the top surface of the plate 21 and moves progressively along the length of the plate in a well-understood manner. The faces 24 and 25 on the edges of the plate 22 are made in a similar manner, but with two torches 26 operating along the edge to produce the two surfaces 24 and 25. The torches 26 are preferably maintained at a constant height, during the beveling operations so as to obtain edge faces that are substantially plane.

Fig. 6 shows the finished weld with welding rod metal 29 melted into and fused to the walls of the trough between the plates 21 and 22.

Fig. 7 shows a modified form of the invention in which the plate edges are shaped for welding from both sides. Plates 31 and 32 have confronting edge portions with outside-bevel surfaces 33 and 34, respectively, forming a trough in which weld metal is deposited when welding from above.

The plate 32 has an inside-bevel surface 35 that overlaps the lower portion of the outside bevel surface 33 in the same manner that the surface 25 of Fig. 3 overlaps the surface 23 of the other plate. The assemblage of Fig. 7 differs from that of Fig. 3, however, in that the inside-bevel surface 35 covers a larger portion of the edge face of the plate in Fig. 7, and there is on the lower portion of the edge face of the plate 31 an inside-bevel surface 37 that forms with a portion of the inside-bevel surface 35 a bottom trough for receiving weld metal of a bottom weld.

Although the invention has been described with plates as the pieces to be joined, it is not limited to the connecting of plates. The invention is susceptible of other modifications and terms of orientation are relative.

I claim:

1. The method of preparing two metal pieces for welding together, which method comprises gas-cutting an edge portion of one of the pieces to form an outside bevel, gas-cutting an edge portion of the other piece to form an outside bevel over most of the height of the edge of said other piece and to form an inside bevel at the lower portion of the edge face of said other piece, and positioning the pieces for welding by bringing them close together and into such relation that the outside bevel faces form a trough and the inside bevel face overlaps the lower portion of the outside bevel face of the other piece.

2. In the making of a welded joint, the method comprising gas-cutting the edge portions of the parts to be joined to form outside bevels at the edges of both of said parts for forming a trough when the edge faces are brought into confronting relation, gas-cutting an inside bevel of relatively little height along the lower edge portion of one, and only one, of said edge faces, positioning the parts for welding with the inside bevel surface overlapping the lower portion of the outside bevel surface of the other part, and welding the parts together while in such relation to one another.

3. The method of making a welded joint comprising preparing the edges of the parts to be joined by gas-cutting the edge portions of the parts to form on said edges substantially plane bevel surfaces, making said bevel surfaces as outside bevels on both parts, and gas-cutting in addition an inside-bevel surface along the lower portion of the edge face of one, and only one, of said parts, positioning the parts for welding with the inside-bevel surface overlapping but spaced a short distance from the lower portion of the outside-bevel surface of the other part, and with the outside-bevel surfaces forming a trough, and joining the parts together by fusing weld metal into the trough and into the cleft at the bottom of the trough.

4. In the joining of plates by welding, the method which comprises gas-cutting the edge portions of the plates to form outside-bevel surfaces along the edge faces that are to be united by welding, maintaining the bevel-producing instrumentality at a constant height during its movement along the plate edges, similarly gas-cutting on one, and only one, edge face an inside-bevel surface of less height than the outside-bevel surface on the same edge face and at an angle that makes the inside-bevel surface substantially parallel to the outside-bevel surface of the other part, positioning the parts for welding with the inside-bevel surface overlapping but spaced a short distance from the lower portion of the outside-bevel surface of the other part, and with the outside-bevel surfaces forming a trough, and joining the parts together by fusing weld metal into the trough and into the cleft at the bottom of the trough.

JAMES L. ANDERSON.